United States Patent
Buer

[19]

[11] Patent Number: 6,148,365

[45] Date of Patent: Nov. 14, 2000

[54] DUAL POINTER CIRCULAR QUEUE

[75] Inventor: Mark Leonard Buer, Gilbert, Ariz.

[73] Assignee: VLSI Technology, Inc., San Jose, Calif.

[21] Appl. No.: 09/107,030

[22] Filed: Jun. 29, 1998

[51] Int. Cl.[7] .................................................. G06F 12/00
[52] U.S. Cl. ............................... 711/110; 710/53; 710/57
[58] Field of Search .................................... 710/3, 52, 53,
710/54, 55, 57, 56; 711/110, 154, 216

[56] References Cited

U.S. PATENT DOCUMENTS

| | | | |
|---|---|---|---|
| 5,978,868 | 11/1999 | Maas | 710/52 |
| 6,003,099 | 12/1999 | Hintukainen | 710/52 |

*Primary Examiner*—John W. Cabeca
*Assistant Examiner*—Denise Tran
*Attorney, Agent, or Firm*—Douglas L. Weller

[57] ABSTRACT

In accordance with the preferred embodiment of the present invention, a first-in-first out queue includes a buffer for storing data. A write pointer indicates a next position for data to be written into the buffer from an external interface. An input pointer indicates a next position for data to be read out to processing circuitry. An output pointer indicates a next position for data which has been processed by the processing circuitry to be returned to the buffer. A read pointer indicates a next position for data to be read out of the buffer to the external interface.

17 Claims, 4 Drawing Sheets

DUAL POINTER CIRCULAR QUEUE

BACKGROUND

The present invention concerns logic used on an integrated circuit and pertains particularly to a dual pointer circular queue.

A first-in-first-out (FIFO) buffer is often used to buffer data into or out of a circuit or logic data block. If it desirable to perform buffering of both data being input to a circuit and data being transferred out of a circuit, two separate FIFO buffers are used, one for input and one for output. While a FIFO buffer is very effective as a buffering device, there is a certain amount of overhead involved in loading data into and out of the FIFO buffer. It is desirable to minimize this overhead to increase processing speed.

SUMMARY OF THE INVENTION

In accordance with the preferred embodiment of the present invention, a first-in-first out queue includes a buffer for storing data. A write pointer indicates a next position for data to be written into the buffer from an external interface. An input pointer indicates a next position for data to be read out to processing circuitry. An output pointer indicates a next position for data which has been processed by the processing circuitry to be returned to the buffer. A read pointer indicates a next position for data to be read out of the buffer to the external interface.

For example, in the preferred embodiment of the present invention, the processing circuitry includes a hash processing block and an encryption/decryption processing block. The encryption/decryption processing block returns data to the buffer after processing. The hash processing block does not return data to the buffer after processing.

Rather than storing all the pointers directly, difference values may be used to derive the pointers. For example, the write pointer is derived from the read pointer and a first difference value. The input pointer is derived from the read pointer and a second difference value. The output pointer is derived from the read pointer and a third difference value.

The present invention increases processing speed by providing multiple uses for a first-in-first-out (FIFO) queue. While the location of data in the FIFO queue is reserved, the data is read out, processed and returned to the FIFO queue. A single FIFO queue can thus be used as both an input buffer and an output buffer for the same circuit.

DESCRIPTION OF THE PREFERRED EMBODIMENT

Figure 1:
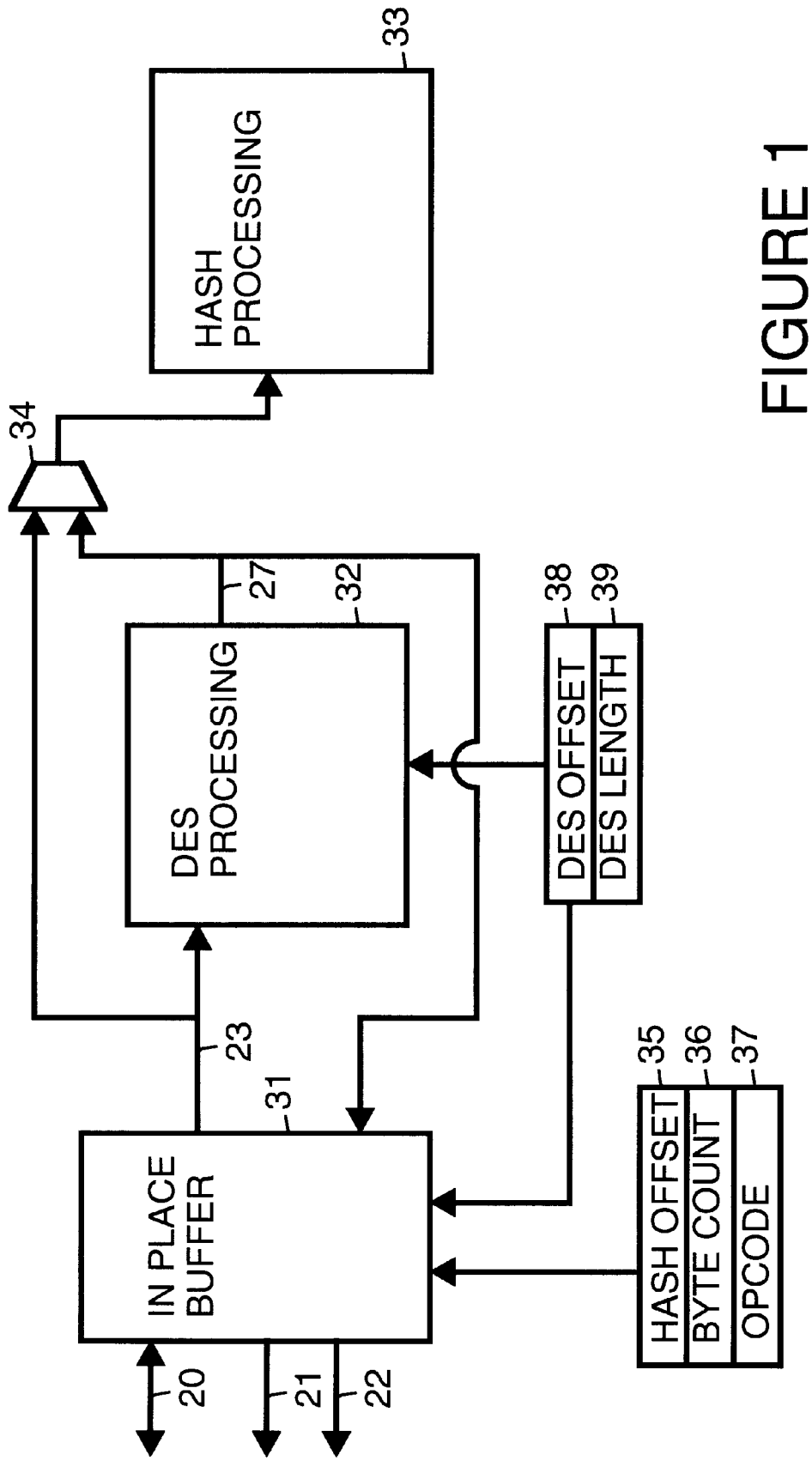
FIG. 1 is a block diagram of a circuit which performs data encryption/decryption and hashing in accordance with a preferred embodiment of the present invention.

FIG. 1 is a block diagram of a circuit which performs data encryption/decryption and hashing in accordance with a preferred embodiment of the present invention. A Data Encryption Standard (DES) processing block 32 includes a high speed ciphering engine that supports the Data Encryption Standard. See for example, Data Encryption Standard (DES), Federal Information Processing Standards Publication (FIPS PUB) 46-2, Dec. 30, 1993 available from the U.S. Department of Commerce, Technology Administration, National Institute of Standards and Technology. See also DES Modes of Operation, Federal Information Processing Standards Publication (FIPS PUB) 81, Dec. 2, 1980 available from the U.S. Department of Commerce, National Bureau of Standards. Alternatively, some other encryption/decryption algorithm may be used.

A hash processing block 33 includes a hash engine which implements the FIPS 180-1 compliant Secure Hash Algorithm (SHA-1) and the MD5 has algorithm. These algorithms are used for computing condensed representations of a message or data filed, called a message digest. SHA-1 generates a 160-bit message digest while MD5 generates a 128-bit message digest.

The message digest is used during generation of a signature for the message. It is also used to compute a message digest for the received version of the message during the process of verifying the signature. Any change to the message in transit will, with very high probability, result in a different message digest, and the signature will fail to verify. The algorithm is designed to have the following properties: it is computationally infeasible to find a message which corresponds to a given message digest, or to find two different messages which produce the same digest.

An in place buffer (IPB) 31 receives data over an SSRAM interface 20. IPB 31 generates a transmit ready (TXRDY) signal 21 and a receive ready (RXRDY) signal 22. In the preferred embodiment, RXRDY signal 22 will be high whenever there are at least eight word (32 byte) locations available in IPB 31. Otherwise RXRDY signal 22 will be low. TXRDY signal 21 will be low whenever there are at least eight word (32 byte) locations which include data that has been processed and is available to be read from available IPB 31. Otherwise TXRDY signal 21 will be low. A hash offset 35, a byte count 36 and an OPcode 17 are used as input to IPB 31. Also used as input are a DES Offset 38 and a DES length 39.

Data in IPD 31 is output on a data path 23 and processed by DES processing block 32 and/or hash processing block 13. A multiplexer 34 selects data directly from IPD 31 or from an output 27 of DES processing block 31 to be forwarded to hash processing block 33.

Figure 2:
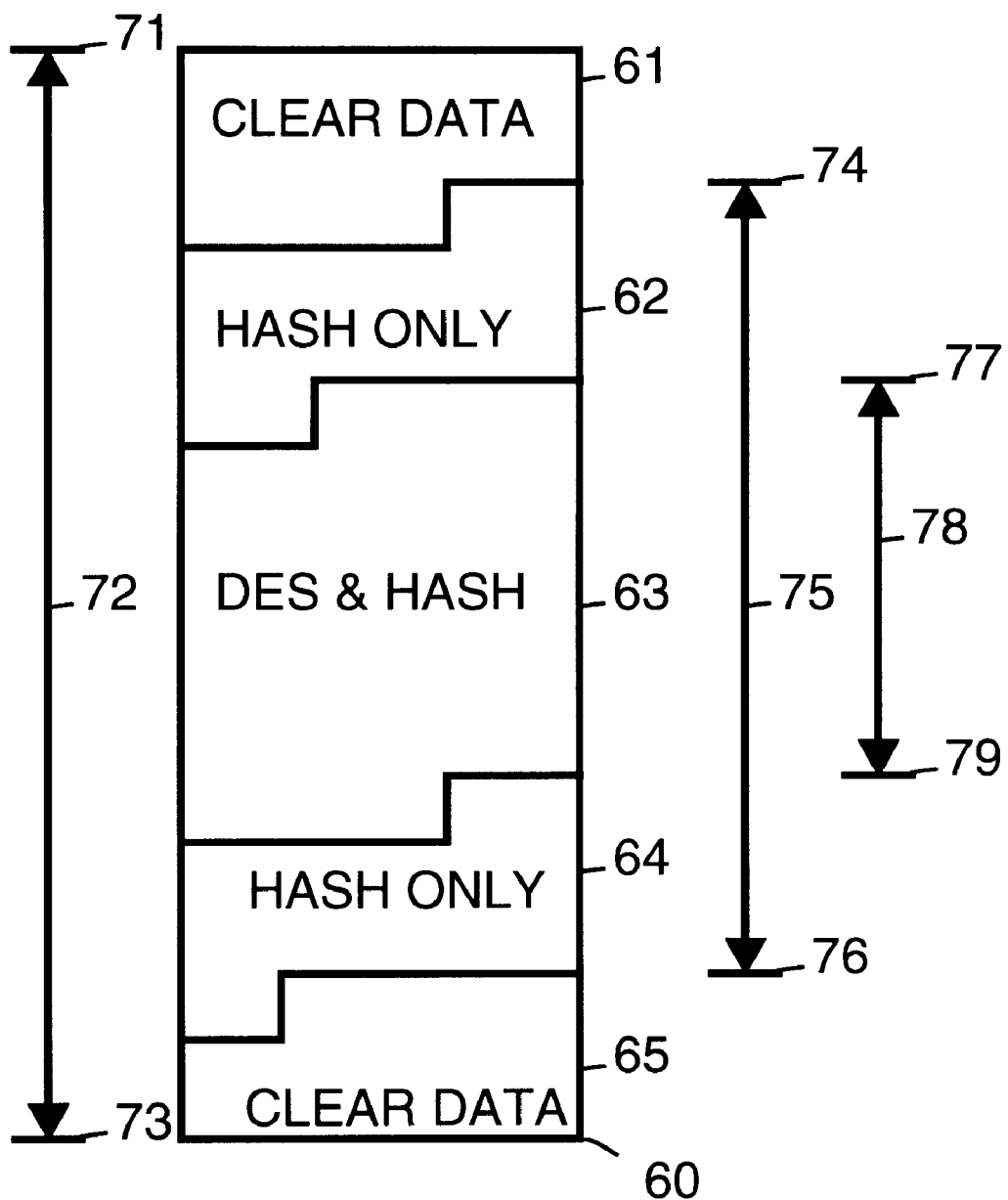
FIG. 2 is a block diagram which shows partitioning of a data packet received by the circuit shown in FIG. 1 in accordance with a preferred embodiment of the present invention.

FIG. 2 is a block diagram which shows partitioning of a data packet 60 received by the circuit shown in FIG. 1. A beginning of packet 60 is represented by a line 71. An end of packet 60 is represented by a line 73. The total length of packet 60 is represented by arrows 72.

From the beginning of packet 60 to a location specified by hash offset 35 is clear data 61, i.e., data which is not subject to hashing or DES processing. A line 74 represents the location in packet 60 specified by hash offset 35. From the location in packet 60 specified by hash offset 35 to a location specified by DES offset 18 is hash data 62, i.e., data which is subject to hashing but not to DES processing. A line 77 represents the location in packet 60 specified by hash offset 35.

From the location in packet 60 specified by DES offset 38 to a location specified by DES offset 38 plus DES length 39 is DES and hash data 63, i.e., data which is subject to hashing and also to DES processing. A line 79 represents the location in packet 60 specified by DES offset 38 plus DES length 39. An arrow 78 represents DES length 39.

From the location in packet 60 specified by DES offset 38 plus DES length 39 to a location specified by hash offset 35 plus a hash length is hash data 64, i.e., data which is subject to hashing but not to DES processing. A line 76 represents the location in packet 60 specified by hash offset 35 plus the hash length. An arrow 75 represents the hash length.

Figure 3:
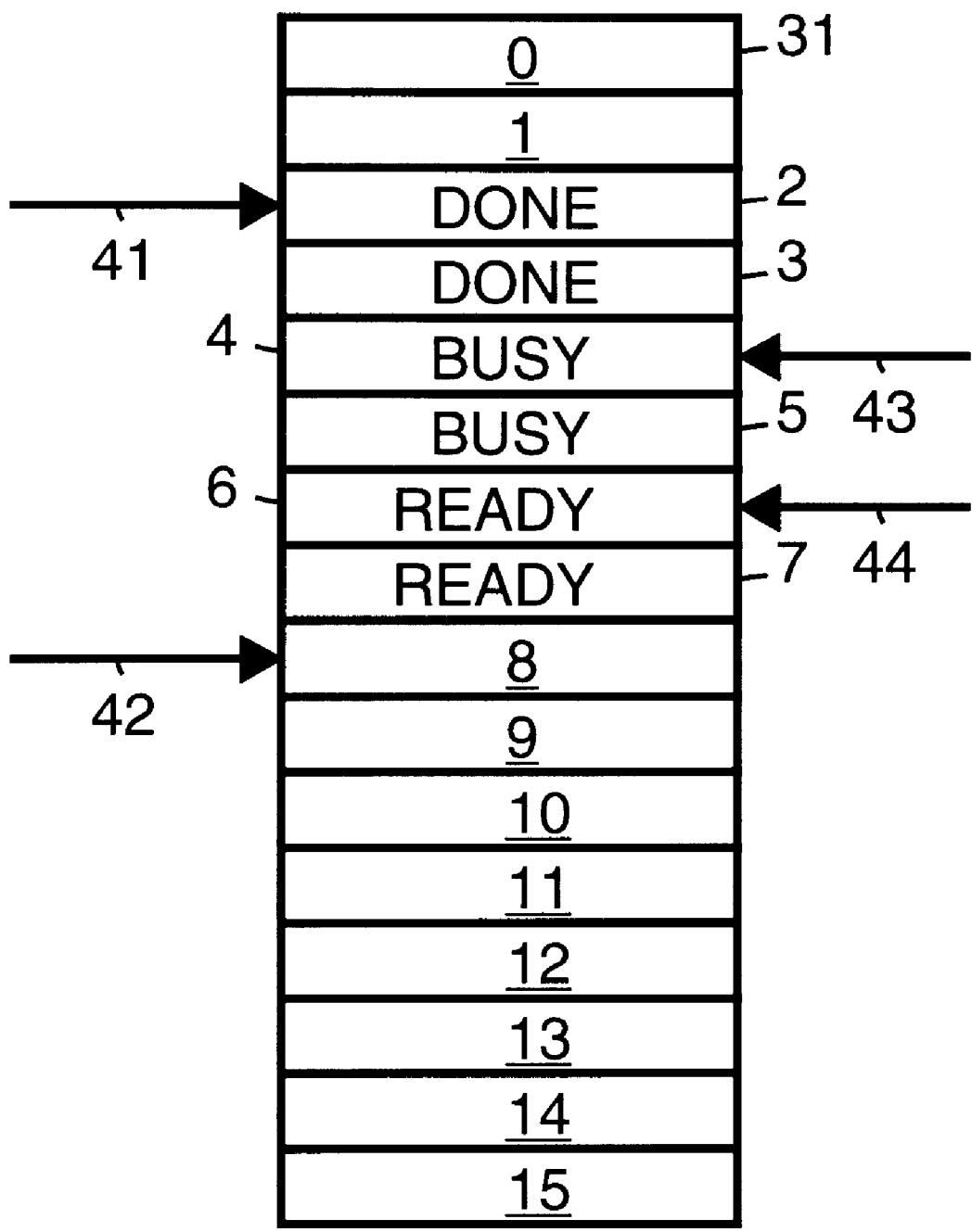
FIG. 3 is a block diagram of a first-in-first-out (FIFO) buffer which functions as a dual pointer circular queue in accordance with a preferred embodiment of the present invention.

IPD 31 operates as a first-in-first-out (FIFO) buffer which is implemented as a dual pointer circular queue. FIG. 3 illustrates how this is accomplished.

Data from SSRAM interface 20 is written into IPD 31 to the location indicated by a write pointer 42. Write pointer 42 points to the location that will be written by the next data word (four bytes). Data is read out of IPD 31 using an input address (iaddr) pointer 44 to locate a next data word (four bytes) that will be processed. Once the processing is complete, an output address (oaddr) pointer 43 is used to replace processed data back into IPD 31. SSRAM interface 20 then reads the processed information out of IPB 31 using a read pointer 41 which denotes the current position in the buffer.

With the write pointer 42, iaddr pointer 44, oaddr pointer 43 and read pointer 41 positioned as shown, data locations 0, 1, 8, 9, 10, 11, 12, 13, 14 and 15 are empty of data. In each of a data location 7 and a data location 6 a four byte word of data has been written and is ready for processing. For each of a data location 5 and a data location 4 a four byte word of data has been read into either DES processing block 32 or hash processing block 33 and is being processed. For each of a data location 3 and a data location 2 a four byte word of data has been processed and returned if required. After hashing the data need not be returned.

In one embodiment of the present invention, only read pointer 41 is actually stored. Instead of tracking the other pointers, read pointer 41 is used as a base in a circular queue and difference values are stored for each of the other pointers. This is illustrated by FIG. 4.

Figure 4:
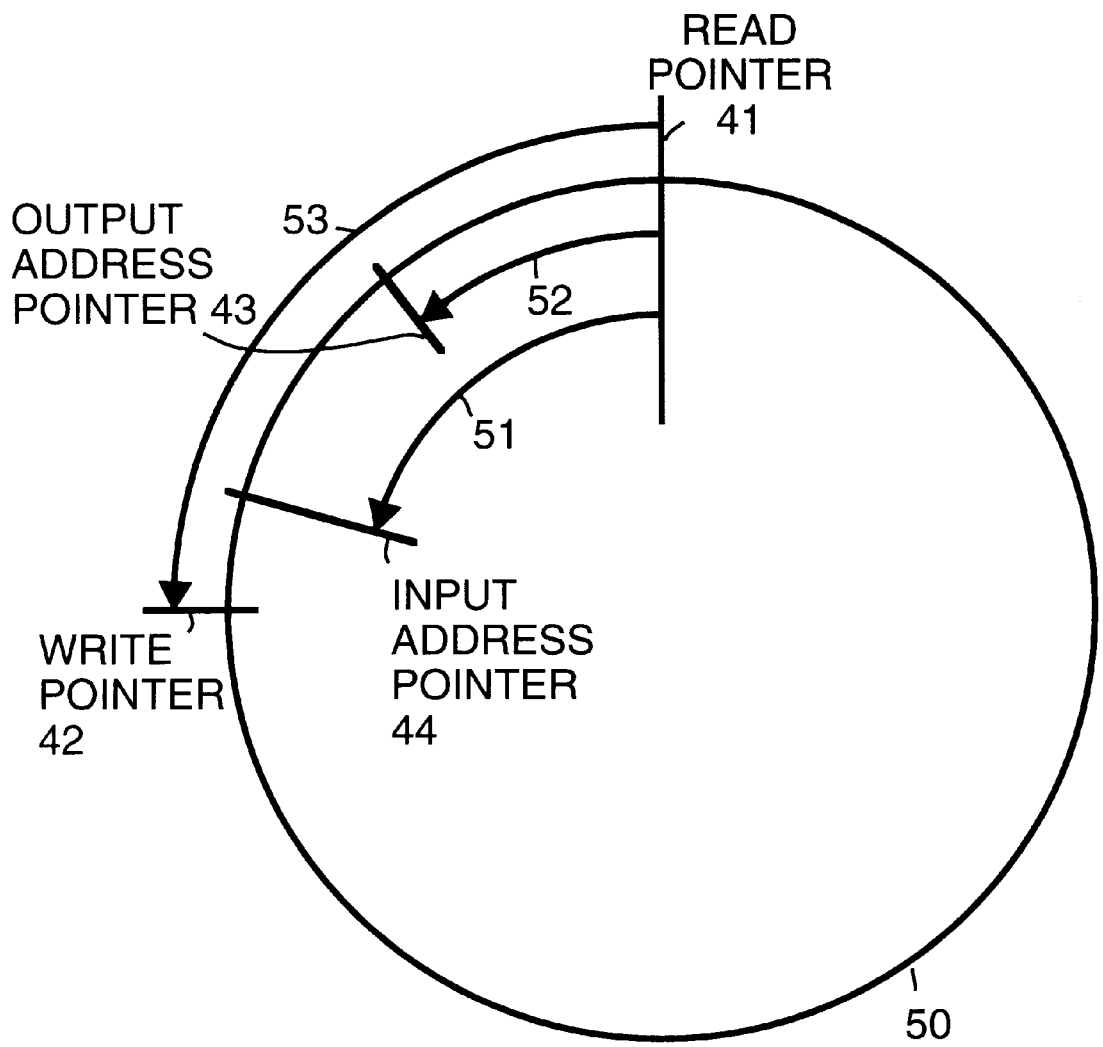
FIG. 4 is a diagram the first-in-first-out (FIFO) buffer which functions as a dual pointer circular queue shown in FIG. 3 in accordance with a preferred embodiment of the present invention.

In FIG. 4, circular queue 50 represents IPD 31. Write pointer 42, iaddr pointer 44, oaddr pointer 43 and read pointer 41 are shown as lines, positioned as shown. A difference value "done" is represented by an arrow 52. The difference value done is the number of four byte words in IPD 31 that have been processed and are available to be read.

A difference value "process" is represented by an arrow 51. The difference value process is the number of four byte words in IPD 31 that are being processed. A difference value "delta" is represented by an arrow 53. The difference value delta is the number of four byte words in IPD 31 that are currently in use (i.e., not empty of data).

The address of each of the pointers (read, oaddr, iaddr and write) can derived from read pointer 41 and the different values as follows:

read=read mod 16
oaddr=(read+done) mod 16
iaddr=(read+process) mod 16
write=(read+delta) mod 16

Write pointer 42 is located by adding the difference value delta to read pointer 41. The difference value delta is incremented when a four byte word is written into IPD 31 from SSRAM interface 20. The difference value delta is decremented when a four byte word is read from IPD 31 to SSRAM interface 20. Byte count 16 (shown in FIG. 1) is used to store the value of read pointer 41.

Table 1 below gives an example of values for a difference value delta, a read pointer and a write pointer for accesses into a four word buffer. A four word buffer is used to simplify illustration of how a difference value is used to calculate the write pointer from the read pointer.

TABLE 1

| Access Type | Read Pointer | Delta | Write Pointer |
|---|---|---|---|
| Reset | 00 | 0 00 | 00 |
| Write | 00 | 0 01 | 01 |
| Write | 00 | 0 10 | 10 |
| Read | 01 | 0 01 | 10 |
| Write | 01 | 0 10 | 11 |
| Write | 01 | 0 11 | 00 |
| Write | 01 | 1 00 | 01 |

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A circular queue comprising:

a buffer for storing data;

a write pointer which indicates a next position for data to be written into the buffer;

an input pointer which indicates a next position for data to be read out in order to be processed;

an output pointer which indicates a next position for data which has been processed to be returned to the buffer; and, a read pointer which indicates a next position for data to be read out of the buffer.

2. A circular queue as in claim 1 wherein the data is processed by a hash processing block.

3. A circular queue as in claim 1 wherein the data is processed by an encryption/decryption processing block.

4. A circular queue as in claim 1 wherein the data is processed by at least one of an encryption/decryption processing block and a hash block and the data is returned to the buffer only after being processed by the encryption/decryption processing block.

5. A circular queue as in claim 1 wherein:

the write pointer is derived from the read pointer and a first difference value;

the input pointer is derived from the read pointer and a second difference value; and, the output pointer is derived from the read pointer and a third difference value.

6. A method for utilizing a first-in-first-out queue comprising the following steps:

(a) writing data from a first interface into a first location within the first-in-first-out queue;

(b) reading the data from the first location in the first-in-first-out queue for processing;

(c) replacing the data into the first location within the first-in-first-out queue after the data has been processed; and (d) writing the data from the first location within the first-in-first-out queue to the first interface.

7. A method as in claim 6 wherein in step (b) the data is processed by a hash processing block.

8. A method as in claim 6 wherein in step (b) the data is processed by an encryption/decryption processing block.

9. A method as in claim 6 wherein in step (b) the data is processed by at least one of an encryption/decryption processing block and a hash block.

10. A method as in claim 6 wherein:

step (a) includes using a write pointer to indicate a next position for data to be written into the first-in-first-out queue;

step (b) includes using an input pointer to indicate a next position for data to be read out of the first-in-first-out queue in order to be processed;

step (c) includes using an output pointer to indicate a next position for data which has been processed to be returned to the first-in-first-out queue; and, step (d) includes using a read pointer to indicate a next position for data to be read out of the buffer.

11. A method as in claim 10 wherein:

in step (a) the write pointer is derived from the read pointer and a first difference value;

in step (b) the input pointer is derived from the read pointer and a second difference value; and, in step (c) the output pointer is derived from the read pointer and a third difference value.

12. A circuit comprising:

processing circuitry;

an external interface; and, a circular queue including:

a buffer for storing data, a write pointer which indicates a next position for data to be written into the buffer from the external interface, an input pointer which indicates a next position for data to be read out to the processing circuitry, an output pointer which indicates a next position for data which has been processed by the processing circuitry to be returned to the buffer, and a read pointer which indicates a next position for data to be read out of the buffer to the external interface.

13. A circuit as in claim 12 wherein the processing circuitry comprises a hash processing block.

14. A circuit as in claim 12 wherein the processing circuitry comprises an encryption/decryption processing block.

15. A circuit as in claim 12 wherein the processing circuitry comprises a encryption/decryption processing block and a hash block.

16. A circuit as in claim 12 wherein:

the write pointer is derived from the read pointer and a first difference value;

the input pointer is derived from the read pointer and a second difference value; and, the output pointer is derived from the read pointer and a third difference value.

17. A circuit as in claim 12 wherein the processing circuitry comprises a encryption/decryption processing block and a hash block and wherein the encryption/decryption processing block returns data to the buffer after processing and the hash processing block does not return data to the buffer after processing.

* * * * *